No. 11,694. Reissued Sept. 20, 1898.

J. E. KENNEDY.

SHOE SOLE.

(Application filed Apr. 21, 1898.)

Attest
F. L. Middleton
C. S. Middleton.

Inventor
John Ernest Kennedy
By Fetherstonhaugh & Co
Atty.

UNITED STATES PATENT OFFICE.

JOHN ERNEST KENNEDY, OF MONTREAL, CANADA.

SHOE-SOLE.

SPECIFICATION forming part of Reissued Letters Patent No. 11,694, dated September 20, 1898.

Original No. 588,768, dated August 24, 1897. Application for reissue filed April 21, 1898. Serial No. 678,354.

*To all whom it may concern:*

Be it known that I, JOHN ERNEST KENNEDY, a citizen of the Dominion of Canada, residing in the city and district of Montreal, in the Province of Quebec, Canada, have invented certain new and useful Improvements in Shoe-Soles; and I do hereby declare the following to be a full, clear, and exact description of the invention, such as will enable others skilled in the art to which it appertains to make and use the same.

This invention relates to shoe-soles; and it consists in the novel construction and combination of the parts hereinafter fully described and claimed.

Figure 1:
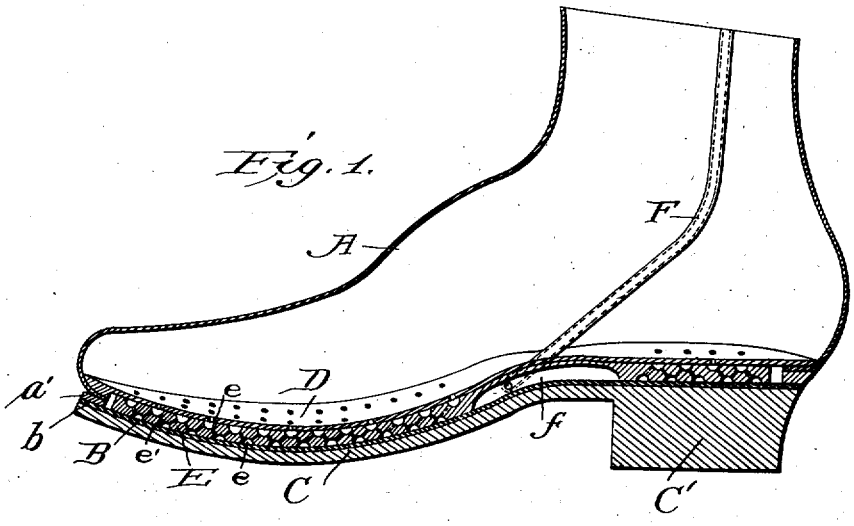
Figure 2:
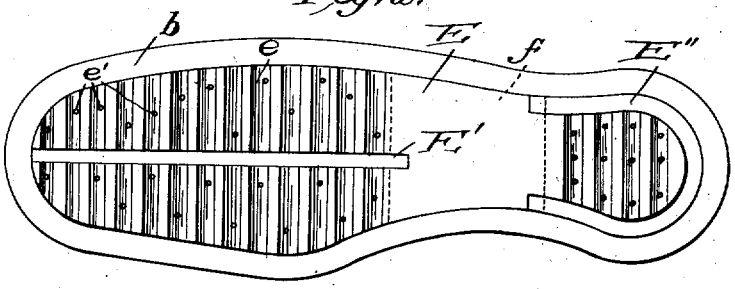

In the drawings, Figure 1 is a longitudinal section through a shoe provided with a sole according to this invention. Fig. 2 is a detail plan view of the corrugated middle sole.

A is the shoe-upper, which is secured to a strip of leather, insole, or welt $a'$ in any approved manner.

B is a layer of thin flexible material, such as canvas, coated or impregnated with india-rubber, and E is the middle sole, secured on the upper side of the layer of canvas B, which forms a projecting flange $b$ around its outer edge. This flange $b$ is secured to the strip of leather, welt, or insole in any approved manner.

C is the outer sole, which may be of leather, india-rubber, felt, or other approved material. The outer sole C is secured under the canvas layer B in any approved manner. The heel C′ is also formed and secured in position in any approved manner.

D is a perforated insole secured above the middle sole inside the shoe. This insole may be made of leather, felt, cotton, or other approved material.

The middle sole E is formed of india-rubber and is corrugated alternately on each side in such a manner as to render it collapsible. The corrugations $e$ of the middle sole are arranged crosswise, and $e'$ are small holes connecting the upper and lower corrugations.

E′ is a central longitudinal channel connecting the corrugations on each side of the sole with a space $f$ in front of the heel portion, and E″ is another channel around the heel portion and connecting the corrugations of such heel portion of the sole with said space $f$. The space $f$ does not require to have corrugations, as there is little pressure at this point.

F is an air-tube connected to the space $f$ or lower interior of shoe and extending up the side of the shoe to the outer air.

When the foot descends in the act of walking, the middle sole collapses under the pressure of the foot and the air is forced out of the corrugations $e$ up the tube. When the foot is raised, the elasticity of the middle sole restores the corrugations to their original positions and draws air from the exterior of the shoe into the corrugations. In this manner a constant circulation of air is established through the middle sole. This circulation of air keeps the shoe thoroughly ventilated and adds greatly to the health and comfort of the wearer.

If desired, the air-tube may be dispensed with and the corrugations of the middle sole may be connected with the outer air in any other approved manner.

The collapsible sole also acts as a cushion, preventing jar to the frame in walking and giving more room to the foot when stepping upon, as the foot then sinks into the space previously occupied by the insole. This relieves the strain on the leather across ball of foot and permits the foot to expand naturally without increasing the exterior width of the shoe.

What I claim is—

1. A collapsible middle sole provided with corrugations $e$ arranged alternately on opposite sides of it, holes $e'$ connecting the upper and lower corrugations, and a longitudinal channel E′ substantially as set forth.

2. A collapsible middle sole provided with corrugations $e$ across its sole and heel, a space $f$ on its under side between its sole and heel, and a longitudinal channel E′ connecting the corrugations of the sole with the said space, said corrugations being arranged alternately on opposite sides of it and connected by small holes $e'$, substantially as described.

3. A collapsible middle sole provided with corrugations $e$ arranged across its sole and heel, a space $f$ on its under side between its sole and heel, a longitudinal channel E′ connecting the corrugations of the sole with the space $f$, and a curved channel connecting the corrugations of the heel with the space *f*, the said corrugations being arranged alternately on opposite sides of it and connected by small holes *e'* substantially as described.

4. A collapsible central sole having corrugated heel and sole portions, and an intermediate air-chamber, with air-channels leading from said chamber to the corrugations substantially as set forth.

5. A collapsible central sole having heel and sole portions corrugated on both sides and an intermediate air-chamber, and channels connecting said air-chamber with the corrugations on both the upper and lower sides of the sole substantially as set forth.

In testimony whereof I affix my signature in presence of two witnesses.

JOHN ERNEST KENNEDY.

Witnesses:
E. V. FETHERSTONHAUGH,
W. J. WITHROW.